(12) United States Patent
Frigeri et al.

(10) Patent No.: US 8,973,486 B2
(45) Date of Patent: Mar. 10, 2015

(54) BREWING UNIT FOR PREPARING BEVERAGES FROM SINGLE SERVICE PACKAGES AND MACHINES COMPRISING SAID UNIT

(75) Inventors: Patrizio Frigeri, Sargans (CH); Roland Kälin, Einsiedeln (CH); Andrea Castellani, Milan (IT)

(73) Assignee: Koninklijke Philips N.V., Eindhoven (NL)

( * ) Notice: Subject to any disclaimer, the term of this patent is extended or adjusted under 35 U.S.C. 154(b) by 961 days.

(21) Appl. No.: 12/744,361

(22) PCT Filed: Nov. 20, 2008

(86) PCT No.: PCT/IT2008/000718
§ 371 (c)(1),
(2), (4) Date: Sep. 24, 2010

(87) PCT Pub. No.: WO2009/069167
PCT Pub. Date: Jun. 4, 2009

(65) Prior Publication Data
US 2011/0017072 A1    Jan. 27, 2011

(30) Foreign Application Priority Data

Nov. 28, 2007  (IT) ................. FI2007A0267

(51) Int. Cl.
*A47J 31/00* (2006.01)
*A23L 1/00* (2006.01)
*B67D 1/00* (2006.01)
*A23L 1/28* (2006.01)
*A23F 5/00* (2006.01)
*A47J 31/36* (2006.01)

(52) U.S. Cl.
CPC .......... *A47J 31/3695* (2013.01); *A47J 31/3676* (2013.01)
USPC ........... 99/289 P; 99/289 R; 99/275; 426/433

(58) Field of Classification Search
USPC ................ 99/279, 281–283, 289 T–291, 295, 99/302 P, 289 R; 426/77, 433
See application file for complete search history.

(56) References Cited

U.S. PATENT DOCUMENTS 3,260,190 A * 7/1966 Levinson ........................ 99/295
6,955,116 B2 10/2005 Hale
7,210,401 B1 * 5/2007 Rolfes et al. ................. 99/289 R (Continued)

FOREIGN PATENT DOCUMENTS

DE  202006002678 U1  5/2006
EP       1050258 A1 * 11/2000 .............. A47J 31/06

(Continued)

*Primary Examiner* — Tu B Hoang
*Assistant Examiner* — Michael Hoang

(57) ABSTRACT

The brewing unit comprises: a support (5); a drawer (7), presenting at least a seat for a single serving package (C), slidable with respect to the support and movable between a loading position of the single serving package and a brewing position; a dispensing member (23) to dispense pressurized water to the single serving package. A control lever (9) is provided to control the movement of the drawer (7). A mechanical connection is also provided between the lever and the drawer and between the lever and the dispensing member, so that operation of the lever causes the drawer to move from the loading position to the brewing position and the dispensing member to rest against the single serving package.

39 Claims, 12 Drawing Sheets

(56) References Cited

U.S. PATENT DOCUMENTS

2003/0070554 A1\*  4/2003  Cortese ............................ 99/279
2005/0126399 A1   6/2005  Bragg et al.
2007/0104837 A1\*  5/2007  Yoakim et al. .................. 426/77
2008/0006159 A1\*  1/2008  Fischer ........................ 99/289 R

FOREIGN PATENT DOCUMENTS

EP     1208782 A1    5/2002
WO  2006016054 A1    2/2006
WO  2006126230 A1   11/2006

\* cited by examiner

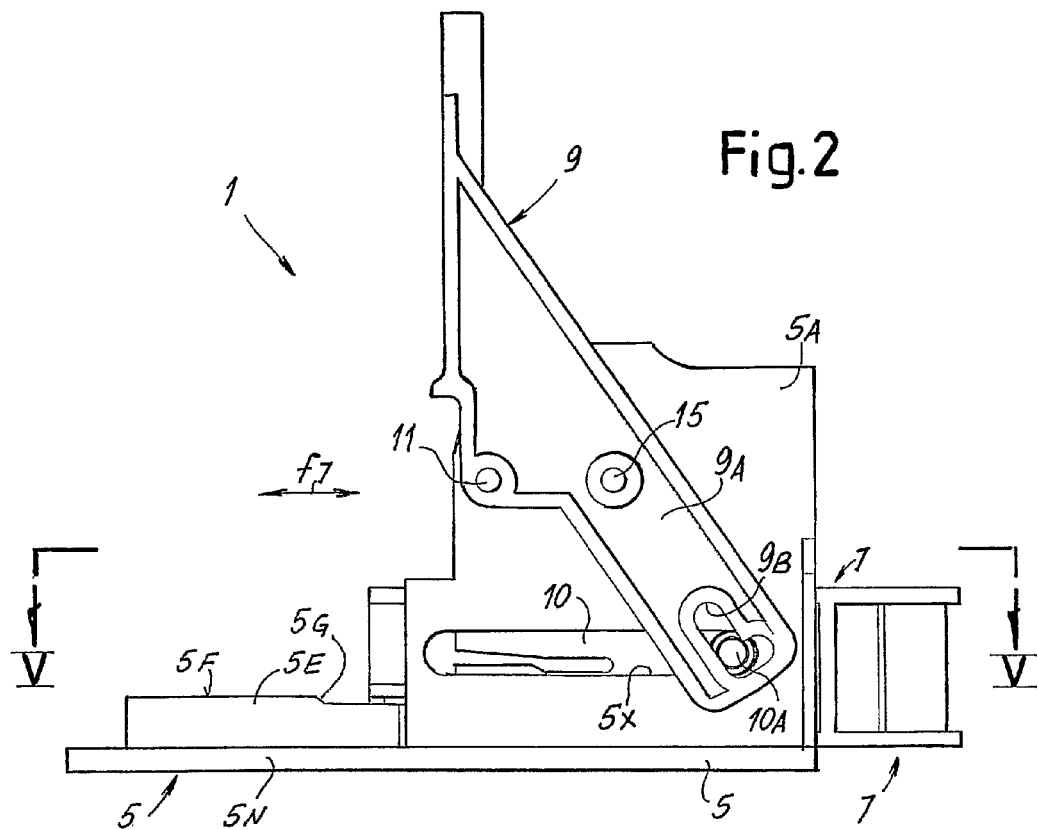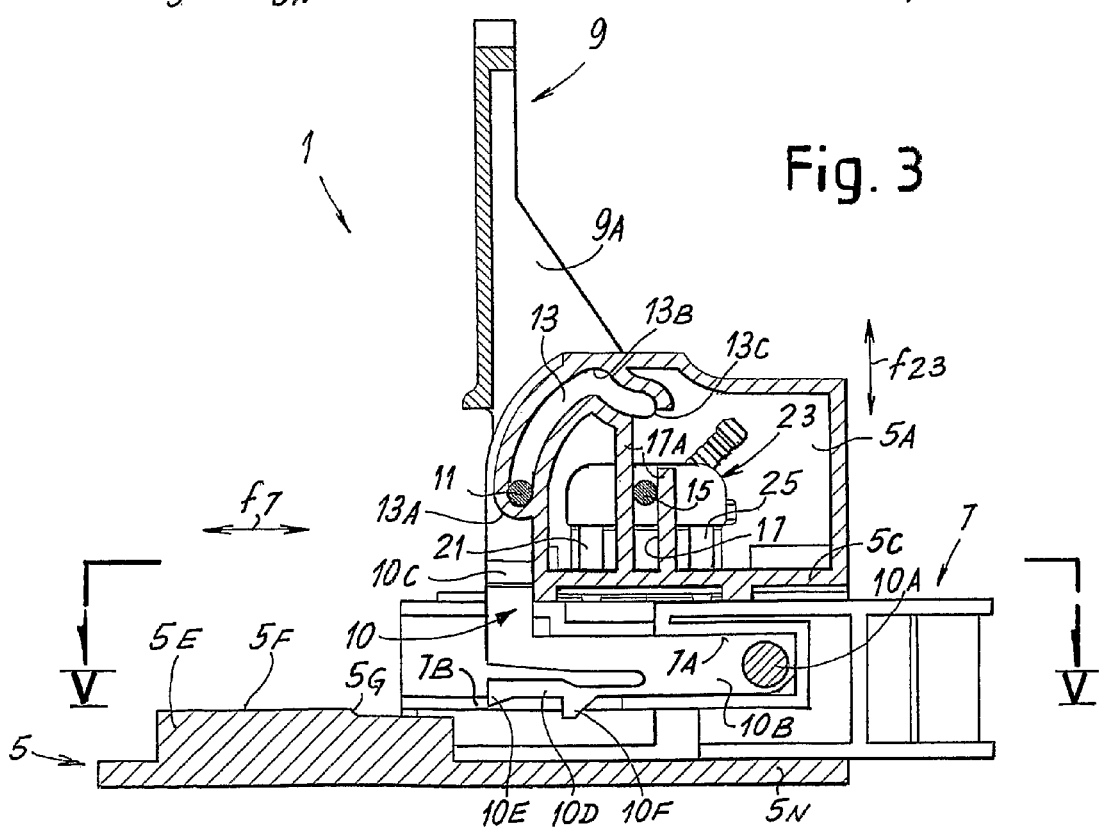

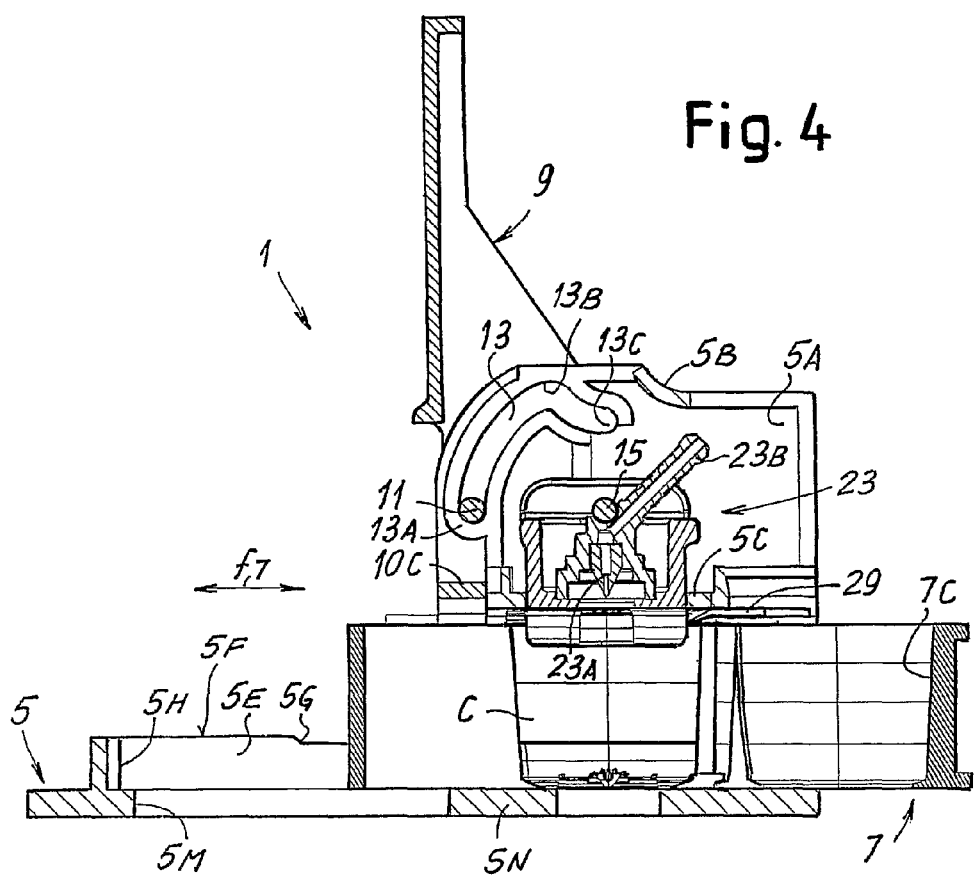
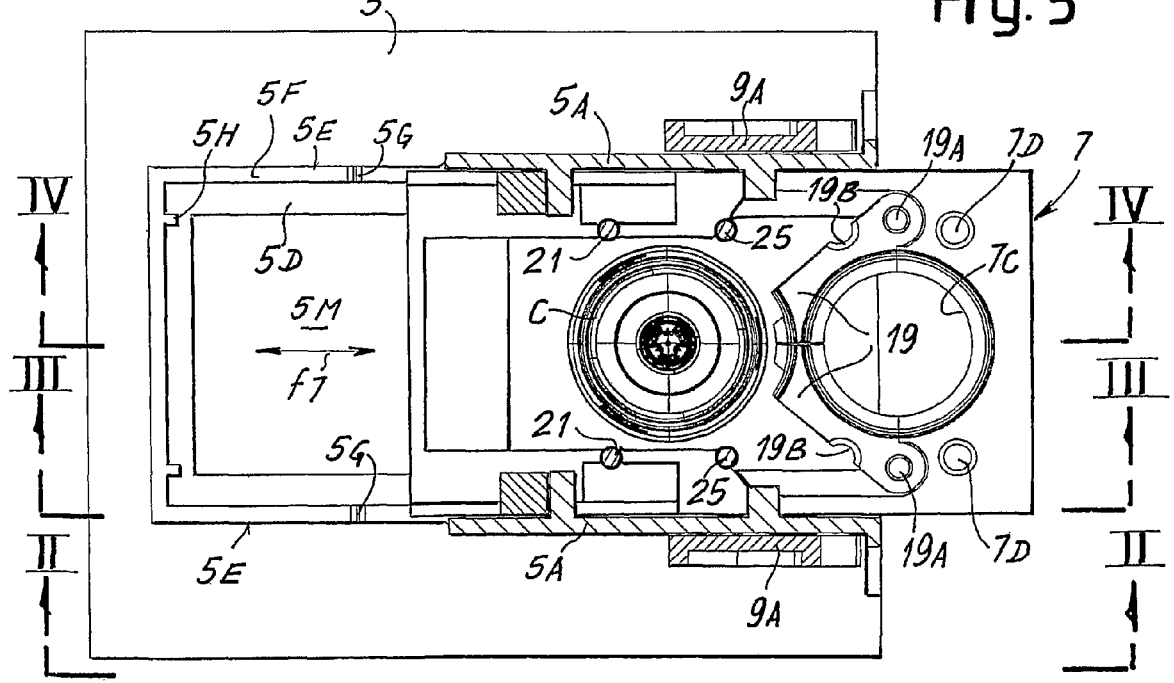

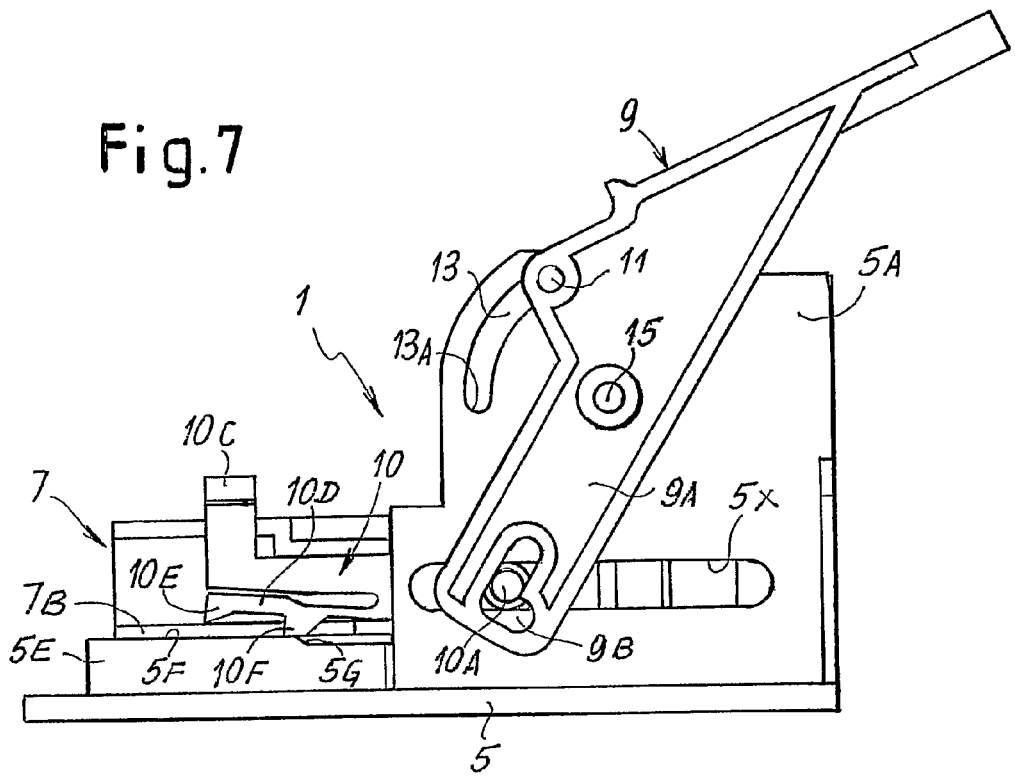
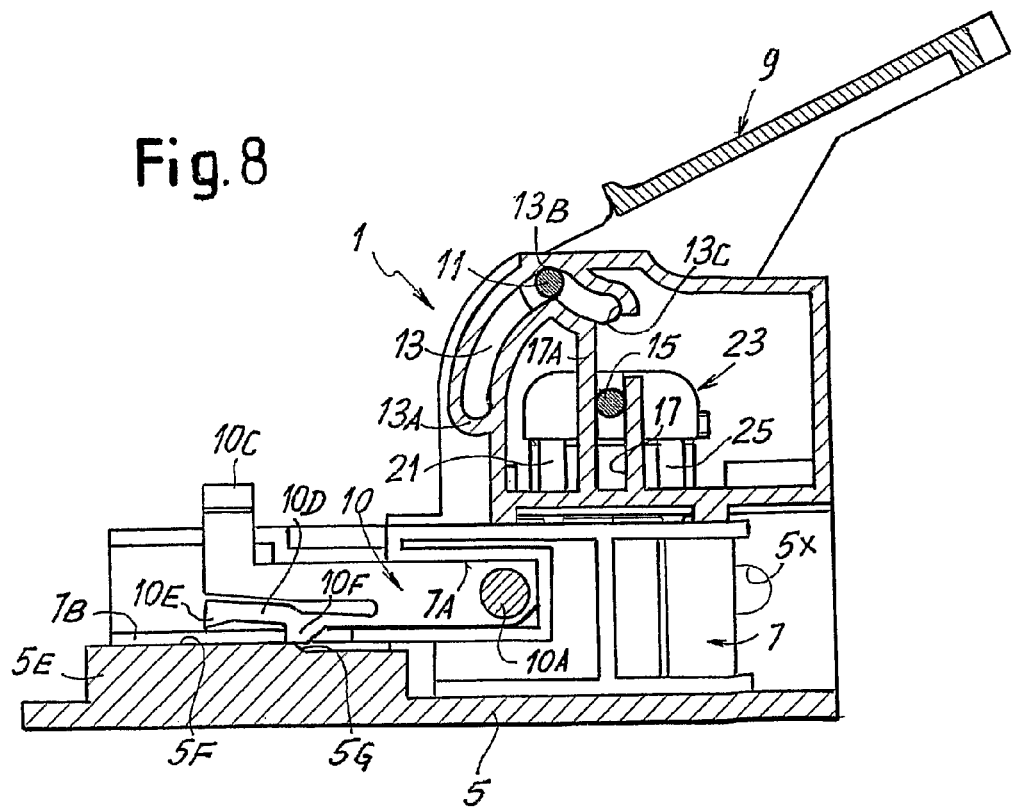

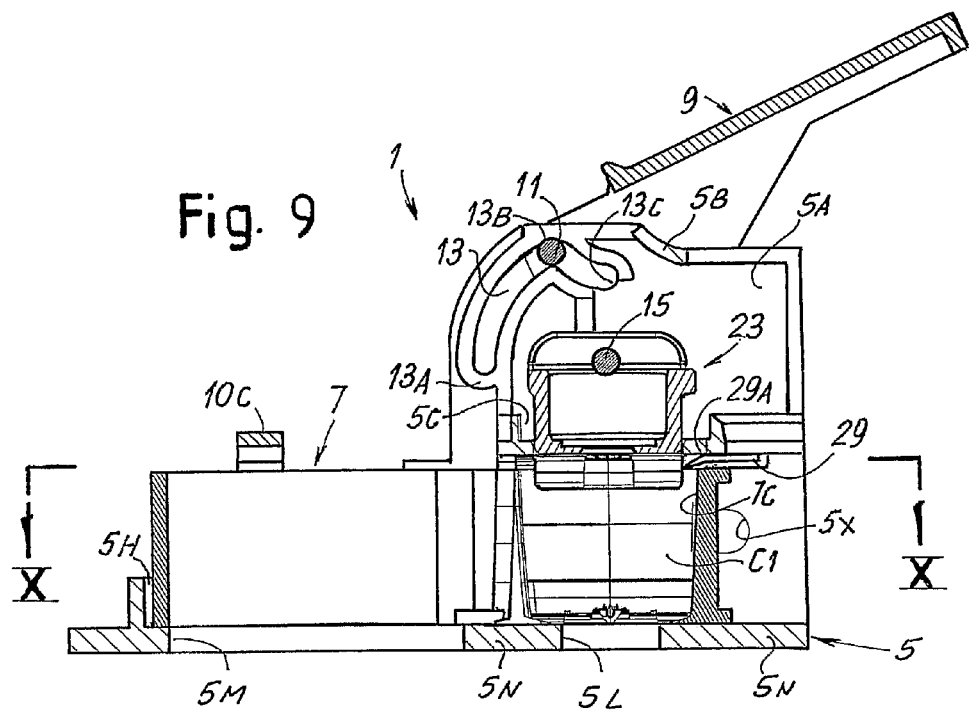
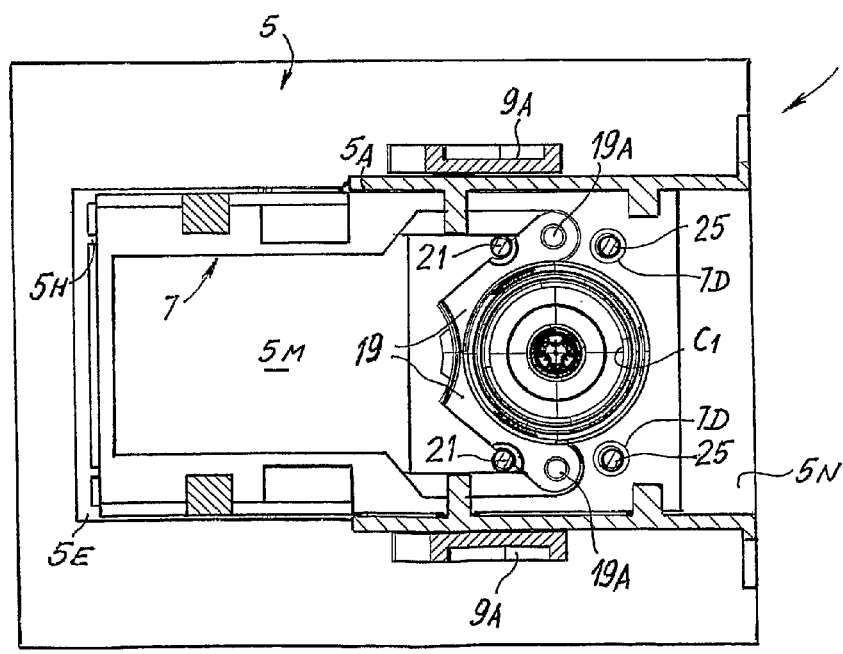

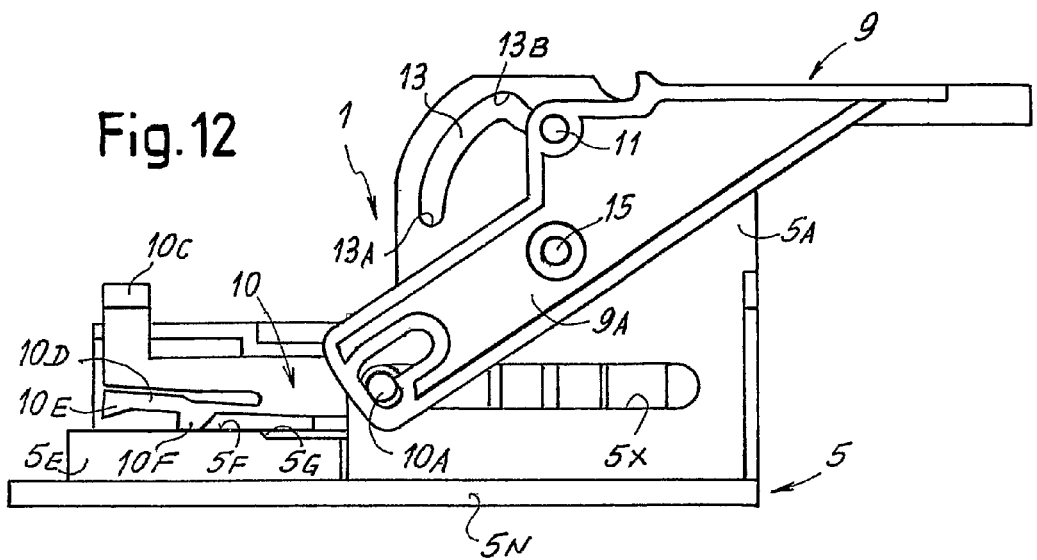
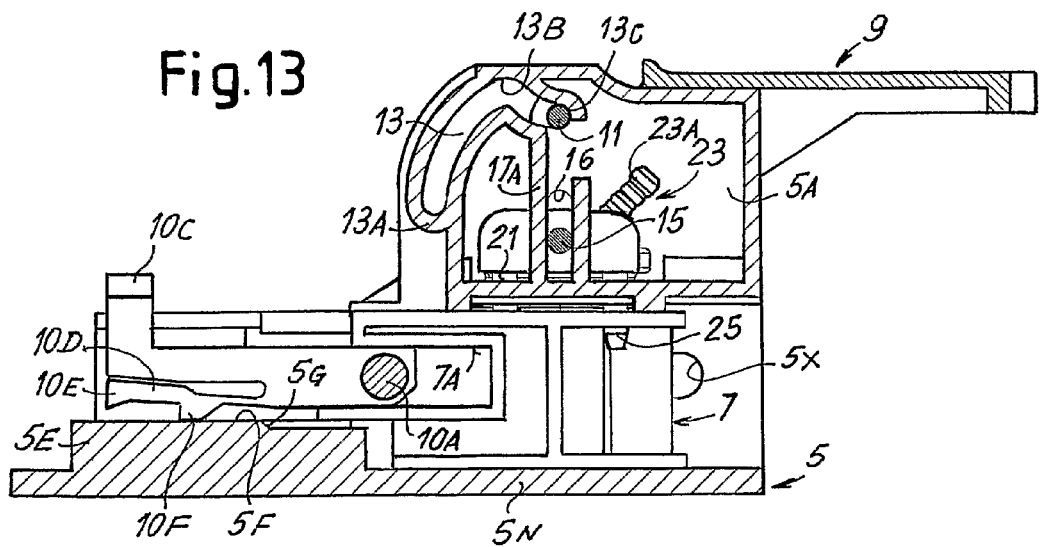

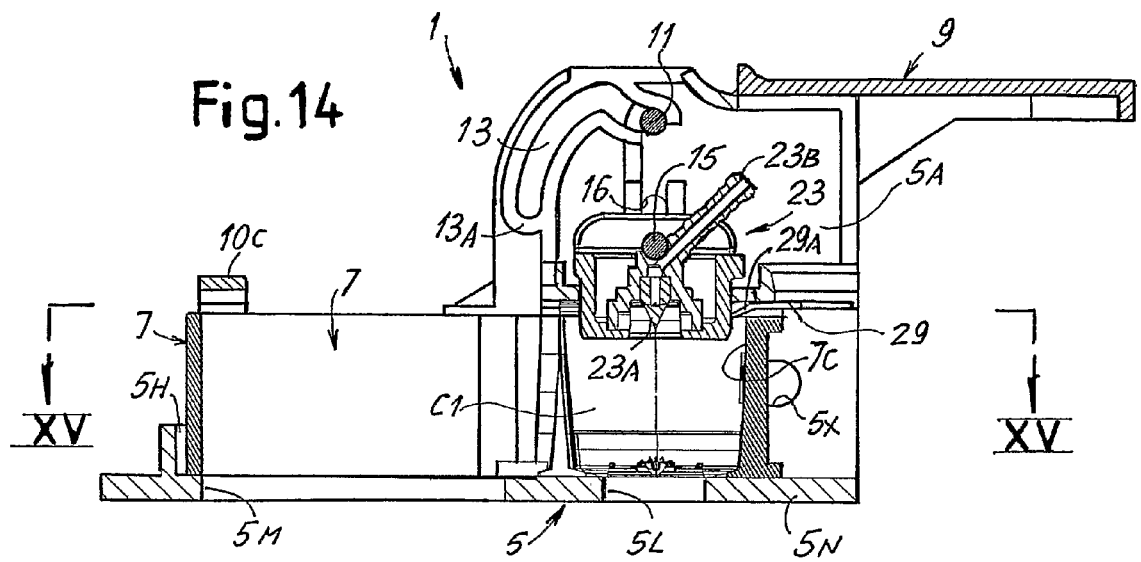
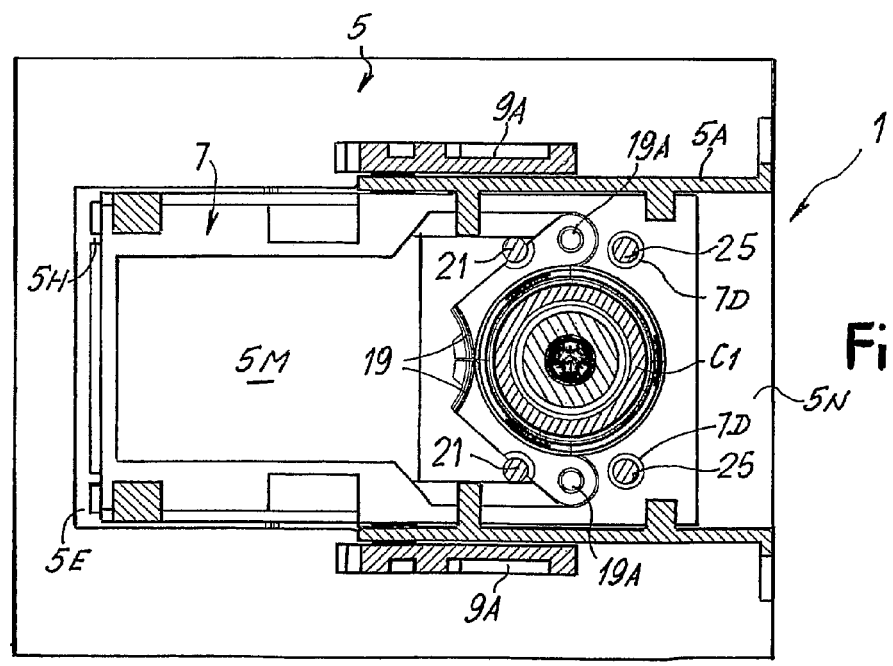

BREWING UNIT FOR PREPARING BEVERAGES FROM SINGLE SERVICE PACKAGES AND MACHINES COMPRISING SAID UNIT

TECHNICAL FIELD

The present invention relates to improvements to brewing units for preparing beverages using capsules, pods or other pre-packed single serving packages, in particular, but not exclusively, for preparing coffee. The invention also relates to machines for preparing beverages, such as in particular (but not exclusively) coffee, comprising brewing units of this type.

STATE OF THE ART

To prepare hot beverages, such as coffee, tea, cocoa or the like, machines are frequently utilized that employ capsules, pods or other single serving packages, inside which the ingredients for preparing the beverage are contained. Machines that utilize single serving capsules containing ground coffee, with which to prepare coffee-based beverages, are widely used. Single serving capsules are inserted in a brewing unit inside the beverage-preparing machine. This brewing unit typically comprises a support and members that serve to perforate, on one or on both faces, the single serving capsule, and members to supply pressurized hot water that passes through the capsule and extracts the substances for preparing the beverage from the ingredients contained therein, or dissolves or dilutes the ingredients contained in said capsule. In some embodiments single serving packages are produced in the form of pods, for example made of valves composed of nonwoven sheets, between which the ground coffee or other food product is enclosed. In this case the pressurized water is dispensed through the nonwoven without the need for perforation. Instead, an area is formed around the surface of the pod, to which pressurized hot water can be fed so that it flows through the pod.

WO-A-2006/016054 describes a brewing unit with two seats to receive two single serving capsules. These seats are housed in a drawer that takes an extracted position to allow the user to insert the capsules in the respective seats, and a position inserted inside the brewing unit, in which the capsules are perforated and pressurized hot water is fed therethrough to obtain the desired beverage at the outlet of the brewing unit.

Other brewing units comprising drawers inside which single serving capsules are inserted are described in U.S. Pat. No. 6,955,116 and in EP-A-1050258.

Another brewing unit including a sliding drawer that receives single serving packages of coffee is described in WO-A-2006/126230.

Capsules, pods or other single serving packages of various forms exist on the market. The brewing units, and the members associated therewith to perform any perforation of the capsules and passage of the pressurized water through the capsule, pod or other single serving package, are structured to allow use of one or other of the various types of capsule on the market. Some capsules are fully sealed and must be perforated both on the upper and lower side to allow water to flow through and the beverage to be extracted. Other capsules are produced so as to be perforated only on the upper side to allow pressurized hot water to enter, while on the lower side they are provided with closing members that allow the beverage to flow through without requiring perforation.

Brewing units present greater or lesser degrees of automation according to the category of machine in which they are to be installed. For example, there are brewing units that perform all the operations automatically after the operator has started up the brewing unit. In this case, a magazine of single serving packages can also be provided, from which individual packages are picked up automatically, inserted in the brewing unit and perforated if required to prepare the beverage, without any manual operations by the operator. Instead, in the simplest units all operations take place manually. The operator opens the brewing unit, inserts the single serving package manually, closes the brewing unit, if necessary pushing the drawer in which the capsule has been placed inside the machine and then performs the brewing cycle.

SUMMARY OF THE INVENTION

An aspect of the present invention relates to a brewing unit particularly intended for single serving capsules that require to be perforated only on one face, or for single serving pods in which the pressurized water is fed by moving a dispensing member to rest against the surface of the pod to define a sealed area into which the pressurized water is fed. According to a further aspect, the present invention relates to a manual brewing unit that allows the various operations of inserting the single serving package, perforation, or other operations preliminary to feeding the pressurized water, and brewing to be performed with simple manual operations.

According to a possible embodiment, the brewing unit includes, in combination: a support; a drawer, presenting at least one seat for a capsule, slidable with respect to said support and movable between a capsule-loading position and a brewing position; a dispensing member for dispensing pressurized hot water to the single serving package. Moreover, the unit comprises a lever to control the movement of the drawer and a mechanical connection between the lever and the drawer and between the lever and the dispensing member, so that operation of the lever alone causes both movement of the drawer from the loading position to the brewing position, and operation of the dispensing member to bring it into contact with the package and in fluid connection therewith, so that pressurized hot water can be fed towards the inside of the single serving package. In some embodiments, the dispensing member is composed of or comprises a perforator. The perforator can include one or more hollow protrusions, to perforate the wall of the single serving package, for example in the form of a capsule. In other embodiments the dispensing member comprises an annular sealing gasket that moves to press against the outer wall of the single serving package, to form a sealed volume into which the pressurized water is fed and from which the water is forced to flow through the wall of the single serving package, which in this case is composed at least partly of permeable material, such as nonwoven, paper or other such material.

Further advantageous characteristics and embodiments of the invention are indicated in the appended claims and described hereunder with reference to some embodiments.

BRIEF DESCRIPTION OF THE DRAWINGS

The invention will be better understood by following the description and accompanying drawing, which shows a non-limiting practical embodiment of the brewing unit according to the invention. More in particular, in the drawing:

FIGS. 2, 3 and 4 show a side view and two cross sections, according to the lines II-II, III-III and IV-IV of FIG. 5, respectively;

FIG. 5 shows a partially sectional plan view according to V-V of FIG. 2;

FIGS. 6 to 10 show an axonometric view, a side view and sectional views equivalent to those of FIGS. 1 to 5, with the brewing unit in the intermediate position where perforation of the capsule starts;

FIGS. 11 to 15 show views and sections similar to those of FIGS. 1 to 5 with the brewing unit in the closed position, i.e. with the capsule perforated and ready to receive the water with which the beverage is prepared;

DETAILED DESCRIPTION OF AN EMBODIMENT OF THE INVENTION

Figure 16:
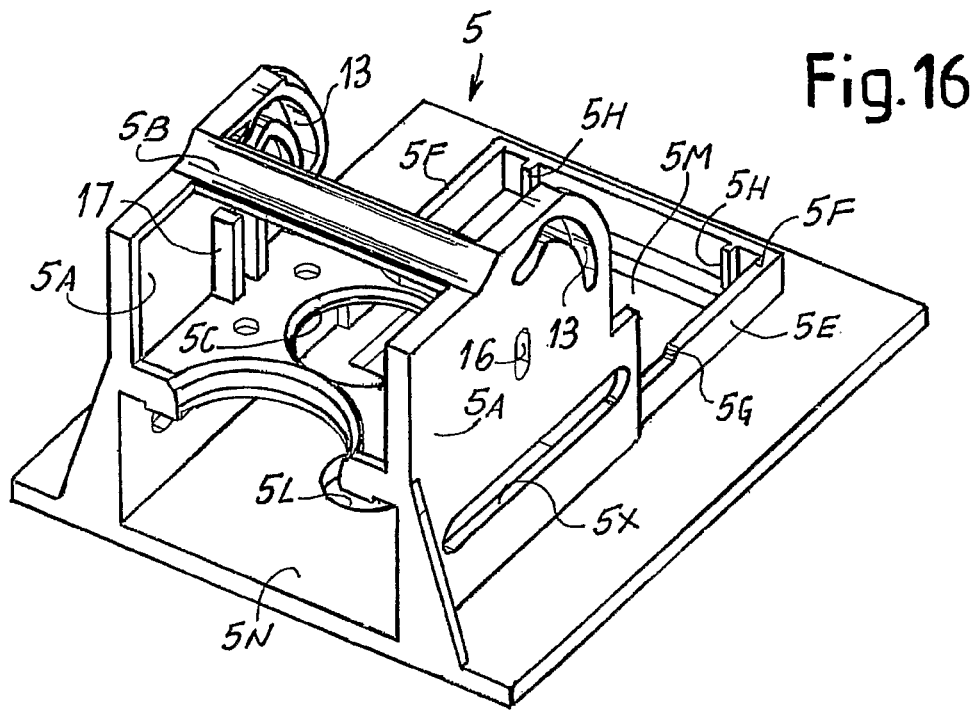
FIG. 16 shows an axonometric view of the fixed supporting structure of the brewing unit.
Figure 17:
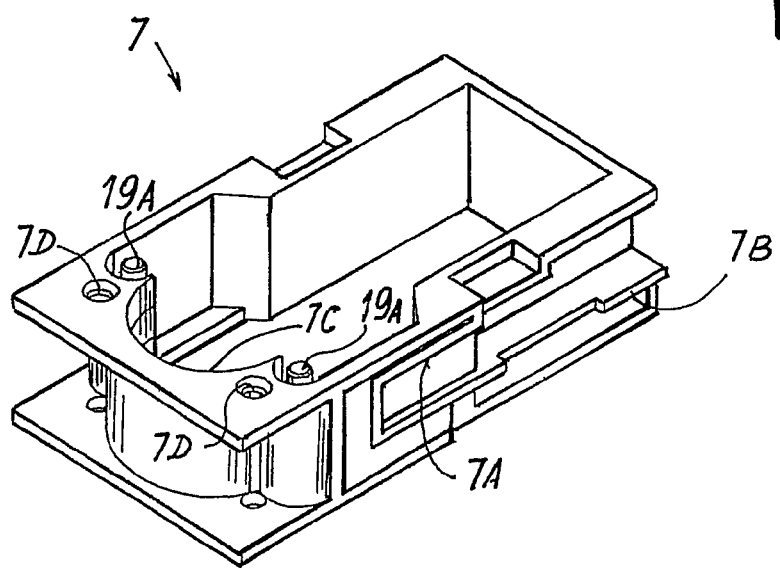
FIG. 17 shows an axonometric view of the sliding drawer.

The brewing unit, indicated as a whole with 1, comprises a support 5 with two sides 5A, mutually joined by a cross member 5B and by a plate 5C. The support or fixed structure 5 is also represented in isolation in FIG. 16.

Figure 11:
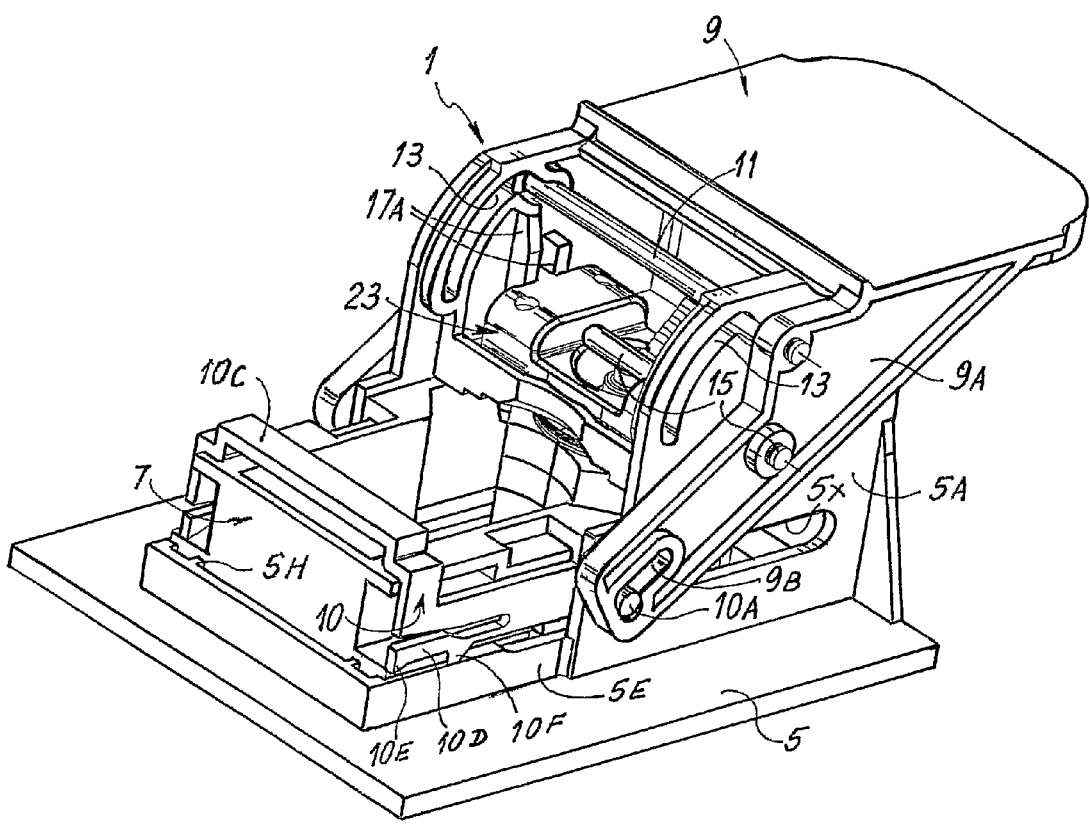

The support 5 defines a sliding guide 5D for a drawer 7, movable between a capsule-receiving position (FIG. 1) and a brewing position (FIG. 11). The direction of movement of the drawer from one to the other of the two end positions mentioned above is indicated with f7.

The movement of the drawer 7 according to arrow f7 is controlled by means of a lever 9, constrained in the manner described below to the side panels 5A of the support 5 and to a pusher 10, by means of which the lever 9 imparts the sliding movement to the drawer 7.

In some embodiments the lever 9 includes two arms 9A constrained to the side panels 5A of the support 5. More in particular, in the embodiment shown a cross pin 11, i.e. extending approximately orthogonally to the direction f7 of movement of the drawer 7, is constrained to the arms 9A. The pin 11 passes through both side panels 5A, passing through slots 13 with mirror symmetry, defining a first cam profile that contributes to define the movement of the lever 9 with respect to the support 5. As can be observed for example in the section of FIG. 3, in one embodiment the cam profile defined by each slot 13 has a first portion curved substantially according to an arc of circumference, extending between a first lower end 13A and an intermediate point 13B that defines a sort of cusp in the trajectory of the pin 11. From the point 13B the cam profile defined by the slot 13 continues with a second curved portion that extends from the area or point 13B to the end 13C. As can be understood by comparing FIGS. 3, 8 and 13, in the open position of the brewing unit (FIG. 3), the pin 11 is at the initial end 13A of the cam profile defined by the slots 13, while in the brewing position (FIG. 13) the pin 11 is at the opposite end 13C. In the intermediate position shown in FIG. 8 the pin 11 is located in the area or point 13B, which corresponds substantially to the position in which the drawer is located in the brewing position, but in which the capsule has not yet been perforated.

The movement of the lever 9 with respect to the support 5 is defined not only by the cam profile given by the slots 13 and by sliding of the pin 11 inside this cam profile, but also by sliding of a second cross pin 15, substantially parallel to the pin 11, constrained to the two arms 9A of the lever and disposed so as to slide inside a guide 17 substantially orthogonal to the pin 15 and to the direction if of movement of the drawer 7. The guide 17 is formed by mutually parallel appendages 17A projecting in pairs from each of the two side panels 5A of the support 5 towards the inside. Substantially rectilinear slots 16 allow the pin 15 to pass through the side panels 5A to be constrained to the arms 9A of the lever 9.

In substance, therefore, the movement of the lever 9 is defined by two cam profiles, one (formed by the slots 13) with a curvilinear shape and the other, defined by the walls 17A and by the slots 16, with a rectilinear shape. The pins 11 and 15 form the followers that cooperate with these two cam profiles. The lever 9 is operated by the operator to be moved from the position shown in FIGS. 1 to 5 to the position shown in FIGS. 11 to 15, passing through the intermediate position shown in FIGS. 6 to 10. The cam profiles defined above impart a movement on the lever suitable to cause on the one hand sliding of the drawer 7 and on the other perforation of the capsule, as will be described below.

Figure 18:
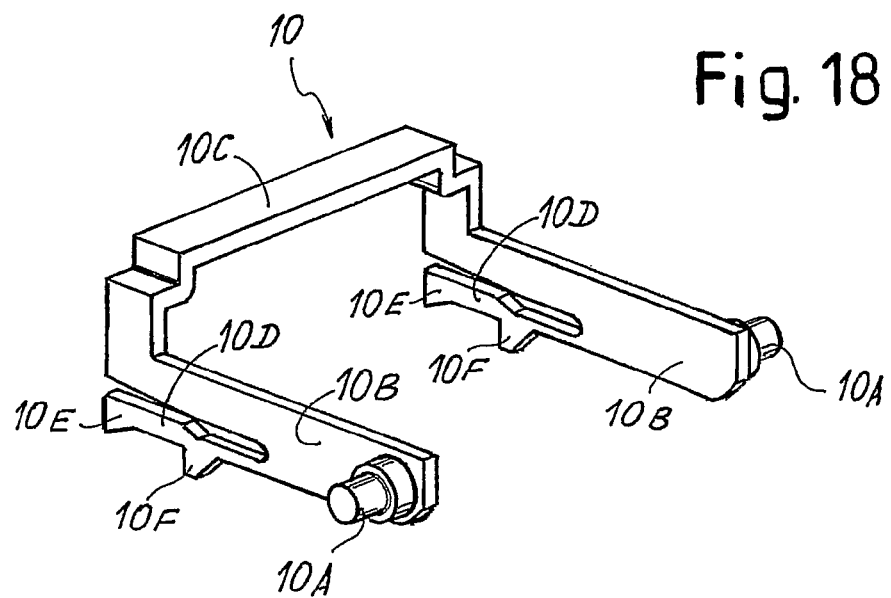
FIG. 18 shows an axonometric view of the pusher associated with the drawer.
Figure 19:
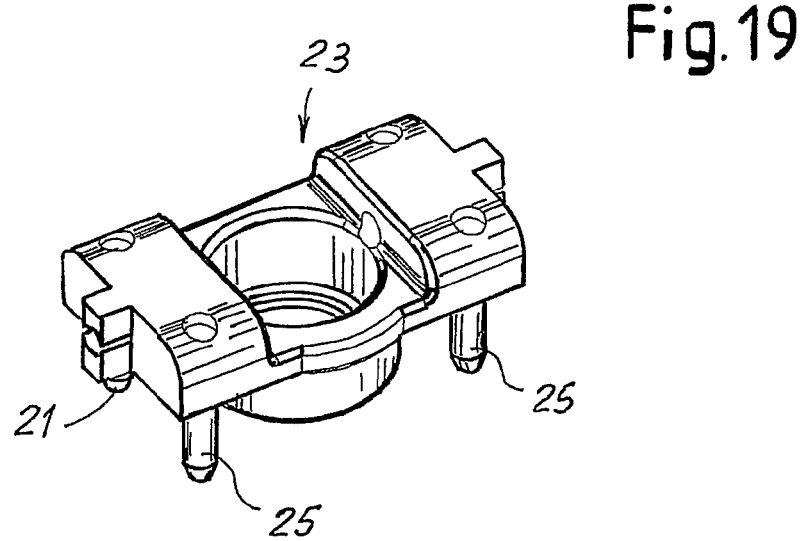
FIG. 19 shows an axonometric view of the perforating member.
Figure 20:
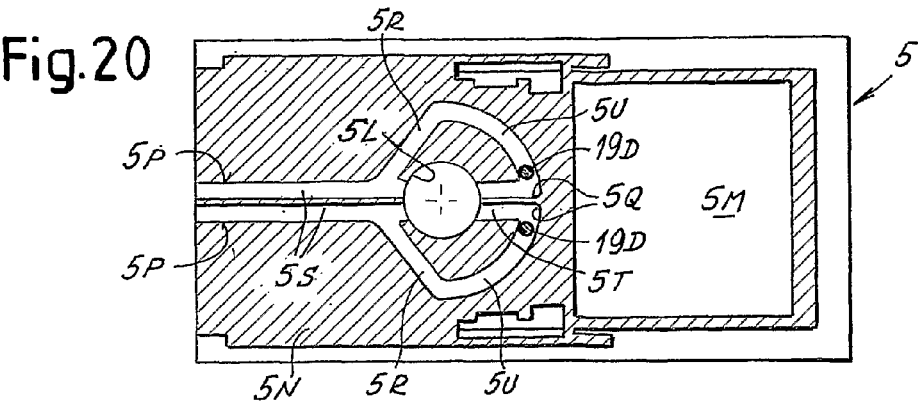
FIG. 20 shows a section according to a horizontal plane of a modified embodiment.

Each arm 9A of the lever 9 has at the final end thereof a slot 9B inside which a respective pin 10A of the pusher 10 engages. This latter has two opposed pins 10A to engage with the two arms 9A of the lever 9. In some embodiments the slot 9B is L-shaped to allow relative movement between each arm 9A and each corresponding pin 10A of the pusher 10 during movement of the lever 9 with respect to the support 5. The pins 10A pass through respective slots 5X provided in the side panels 5A of the support 5. As can be seen in particular for example in FIG. 18, the pins 10A have a portion of lesser diameter that engages in the slots 9B of the arms 9A and a portion of greater diameter that slides inside the respective slot 5X, the width of which is substantially equal to the diameter of said pin in this section, so as to form a rectilinear guide for movement of the pusher 10.

In some embodiments, the pins 10A of the pusher 10 are integral with respective plates 10B disposed inside the side panels 5A of the support 5 and parallel thereto, said plates being frontally joined by a cross member 100. Each plate 10B of the pusher 10 is slidable inside a guide 7A formed on the respective side of the drawer 7. This allows the pusher 10 to slide with respect to the drawer to perform an over-travel with respect to the movement of the drawer 7, as will be explained in greater detail below.

The front end of each plate 10B of the pusher 10, opposite the respective pin 10A, forms an elastic appendage 10D with a first tooth 10E and a second tooth 10F, which have the function of engaging the drawer 7 to push it towards the brewing position and of releasing the pusher 10 from the drawer 7 to allow an over-travel of the pusher 10 with respect to the drawer 7, all as described in greater detail below.

In the front area the drawer 7 has on each side a projection 7B, with which the first tooth 10E of the respective plate 10B of the pusher 10 cooperates. As can be seen in particular in FIGS. 1, 3 and 6, the two teeth 10E of the pusher 10 act against the two projections 7B of the drawer 7, so that when the pusher 10 is moved from right to left (in the figure) by means of clockwise rotation-translation of the lever 9, the sliding movement of the pusher 10 causes the drawer 7 to move from right to left.

Around the seat 5D inside which the drawer 7 slides, the support 5 presents a wall 5E with an upper edge 5F forming a step 5G on each side of the sliding seat 5D of the drawer 7. Each tooth 10F of the pusher 10 slides along the edge 5F of the wall 5E of the support 5. When the tooth 10F encounters the step 5G in the movement from right to left of the pusher, this tooth is pushed upwards and this causes elastic deformation of the respective appendage 10D and consequently release of the respective tooth 10E from the projection 7B of the drawer 7. This allows an over-travel of the pusher 10 with respect to the drawer 7, to perform the functions that will be explained below in greater detail.

The drawer 7 has a fixed back portion 7C with a truncated-cone shaped surface. More precisely, in the embodiment shown the fixed portion 7C forms a surface corresponding to half of a frustum of cone, with a shape substantially corresponding to that of the conical lateral wall of a single serving capsule C. The fixed portion 7C delimits, together with two oscillating arms 19 pivoted in 19A to the drawer 7, the capsule (C) receiving seat.

As can be seen in particular for example in the plan and partly sectional view of FIG. 5, the oscillating arms 19 are held in closed position by elastic members, such as helical springs, not shown, and mounted on pivot pins 19A, to form together with the fixed portion 7C a substantially truncated cone shaped seat for receiving the brewing capsule C. In the position of FIGS. 1 to 5, the drawer is in the position so that the seat formed by the elements 7C and 19 is accessible to the user, who can insert a new capsule therein to prepare a coffee or other beverage.

The arms 19 frontally has recesses 19B that cooperate with members to block the arms with respect to the drawer when the drawer is in the position of FIGS. 6 to 15. In some embodiments, the blocking members comprise two pins or rods 21 integral with a pressurized water-dispensing member. In the embodiment shown, the pressurized water-dispensing member is composed of or comprises a perforating member indicated as a whole with 23. The perforating member 23 is constrained to the pin 15 of the lever 9 and is therefore provided with a translational movement according to the double arrow f23, obtained by sliding of the pin 15 in the guide 17 defined by the walls 17A described above. In addition to the pair of pins 21 that serve to block the oscillating arms 19, further two pins 25 to block the drawer are integral with the perforating member 23. When the perforating member 23 is moved downwards, these pins 25 penetrate the holes 7D provided in the drawer 7.

Operation of the brewing unit described above is as follows.

Initially, the brewing unit is in the position of FIGS. 1 to 5. In the drawing, a spent capsule C used in the previous brewing cycle is shown inside the brewing unit (see in particular FIGS. 4 and 5). This capsule has been released from the drawer 7 in the opening movement of the previous cycle and will be ejected during the subsequent cycle. The drawer 7 is partially extracted from the brewing unit, so that the back portion thereof, in which the seat formed by the fixed portion 7C and by the oscillating arms 19 is defined, is accessible for insertion of a new capsule.

In the completely open position of FIGS. 1 to 5, the pusher 10 is located in the rearmost position thereof towards the right (in the drawing) and the elastic appendage 10C is in the fully lowered idle position thereof, while the teeth 10C and 10F are disengaged with respect to the edge 5F of the support 5. The lever 9 is in a substantially vertical position; the pin 11 forming the follower for the cam profile defined by the slots 13 is in the bottom position at the ends 13A of the slot 13. The perforating member 23 is in the raised position, being integral with the pin 15 constrained to the lever 9, which is also in the fully raised position thereof inside the guide 17.

To perform the brewing cycle, the following operations must be performed:
 ejecting any spent capsule C present in the brewing unit,
 moving a new capsule inserted in the seat 7C, 19, 19 to the brewing position,
 perforating the upper side of the capsule and then dispensing pressurized hot water through the capsule to prepare the beverage.

Figure 1:
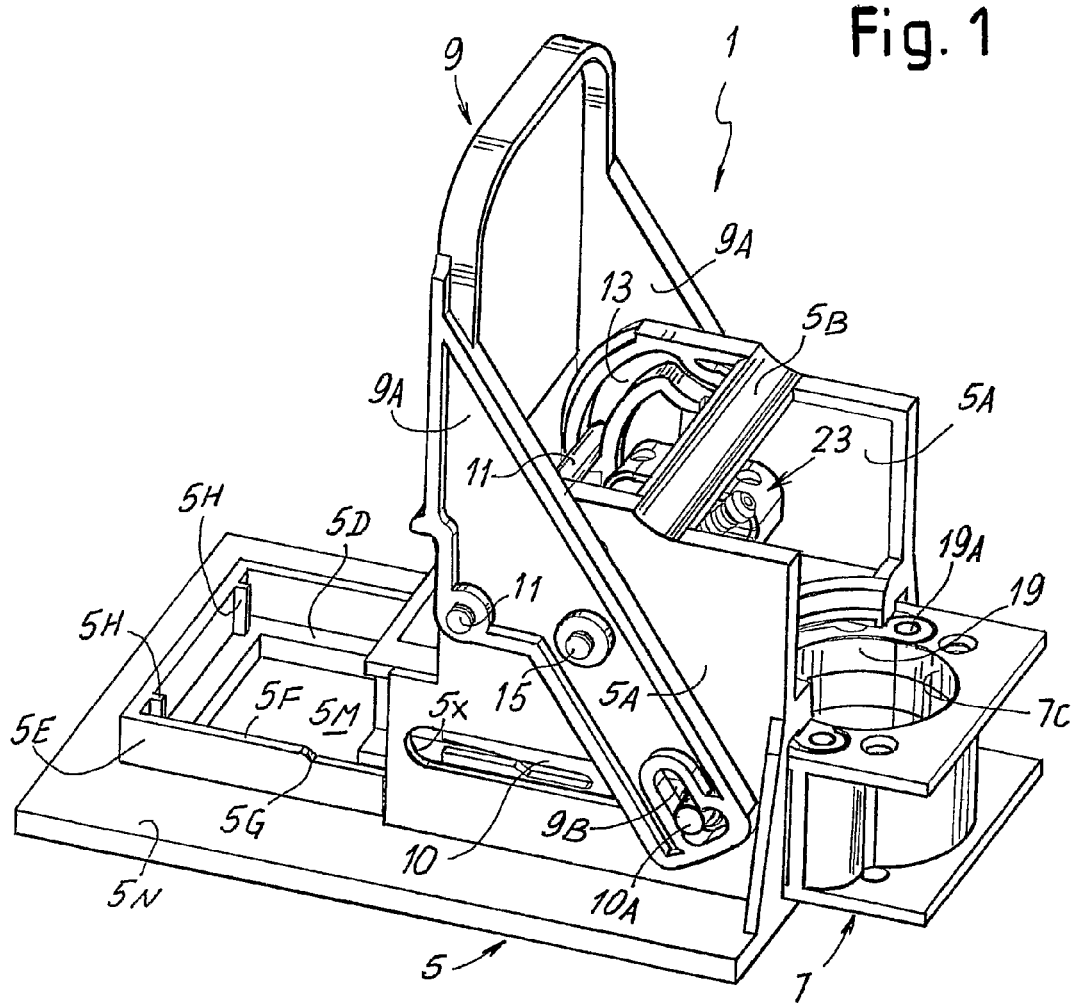
FIG. 1 shows an axonometric view of the brewing unit in the open position, ready to receive a new single serving capsule for preparing a beverage.
Figure 6:
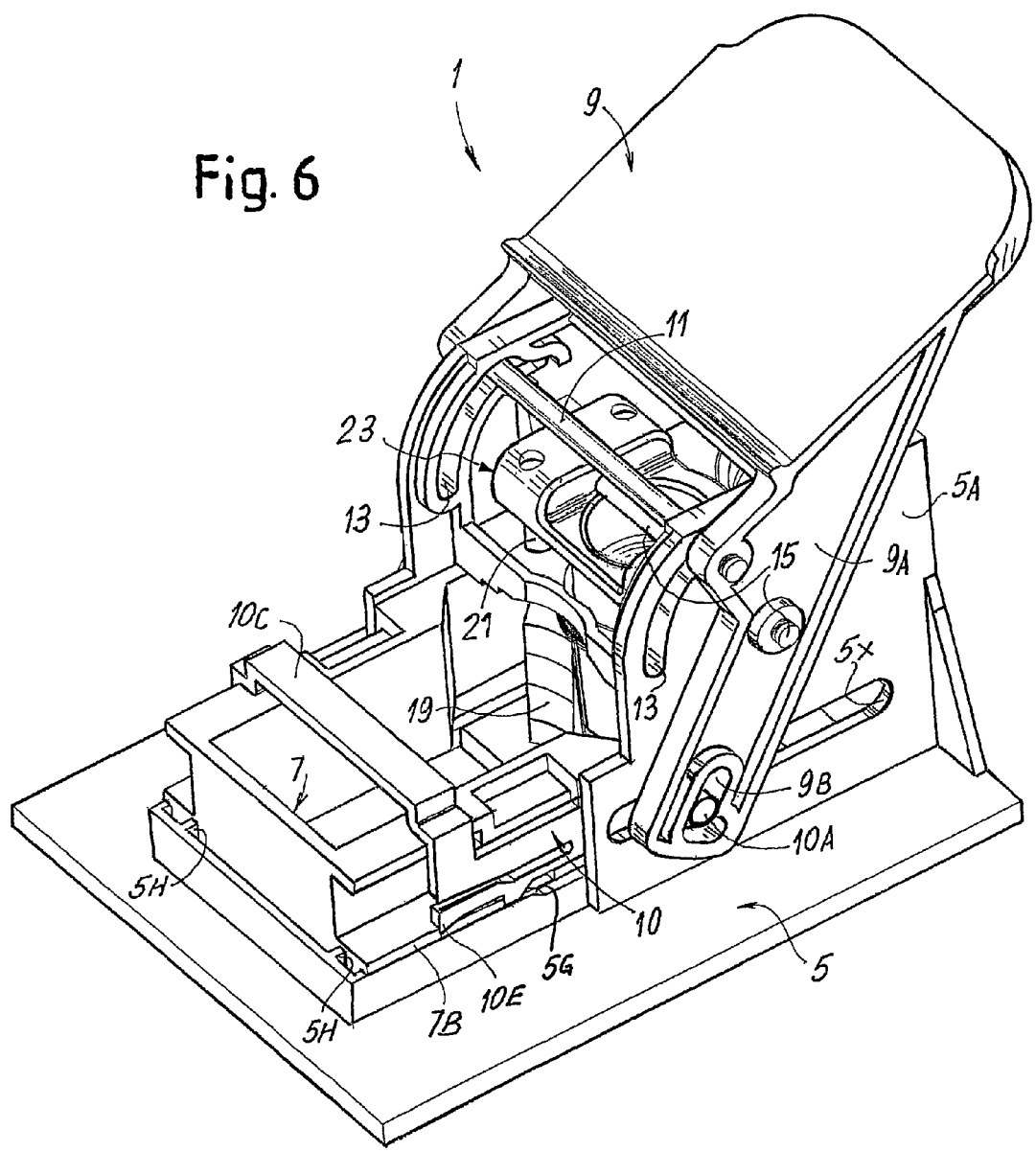

All these operations are performed with a simple movement of the lever 9 from the position of FIG. 1 to the position of FIG. 11.

In FIGS. 6 to 10 the lever has performed a first part of its movement, which, due to the constraint represented by the pins 11, 15 with respect to the structure or fixed support 5, is not an oscillating movement, but a combined rotational-translational movement. This allows all movements required to obtain the aforesaid operations to be performed.

In the intermediate position of FIGS. 6 to 10, the lever has moved to bring the pin 11 to the fully raised position corresponding to the position 13B of the slot 13 provided on each of the two side panels 5A. The pin 15 has remained substantially in the initial position. This is due to the fact that the first curved portion of the slot 13, extending from the end 13A to the intermediate point 13B, is substantially circular with center substantially coincident with the axis of the pin 15 when this is in the position of FIGS. 1 to 10. Consequently, in this first stage the perforating member 23 does not perform any movement. Conversely, the lever 9 performs an oscillating movement about the axis of the pin 15. In this oscillating movement the free ends of the arms 9A of the lever 9 move counter-clockwise (in the drawing) and, due to coupling between the pins 10A and the slots 9B, draw the pusher 10 to make it perform a first rectilinear stroke guided by the pins 10A in the slots 5X of the fixed support 5. In the initial position (see in particular FIG. 3), the tooth 10E of each plate 10B of the pusher 10 is in contact with the respective projection 7B of the drawer 7. Therefore, the translational movement from right to left of the pusher 10 obtained through oscillation of the lever 9 causes an identical translation of the drawer 7 until the position of FIGS. 6 to 10 is reached. In this position the tooth 10F of each plate 10B of the pusher 10 is located at the respective step 5G provided on the edge 5F of the wall 5E of the fixed support 5. The further movement to the left caused by further lowering of the lever 9 makes the two teeth 10F mount the step 5G, elastically deforming the appendages 10D and releasing the teeth 10E from the projections 7B of the drawer 7. In this manner, the pusher 10 performs an over-travel to the left (in the drawing) with respect to the movement of the drawer 7, which does not move beyond the position reached at this stage. For this purpose, front stops 5H can also be provided (see in particular FIG. 6), against which the drawer 7 stops.

The position reached is such that the seat formed by the portion 7C and by the oscillating arms 19, in which a new capsule C1 has been inserted (FIG. 9), is axially aligned with the perforating member 23, below said member. Below the perforating member 23 the fixed support 5 has an opening 5L for delivery of the beverage prepared by the capsule C1, which due to its structure does not require to be perforated on the lower side.

During the translational movement of the drawer 7 from the position of FIGS. 1 to 5 to the position of FIGS. 6 to 10, the spent capsule C that was located in the brewing unit and was used in the previous brewing cycle is pushed by the front surfaces 19C of the oscillating arms 19 to follow the movement of the drawer 7 until reaching a second opening 5M provided in the base of the fixed support 5. In this manner, the spent capsule falls under the brewing unit 1 into a collection container, not shown.

In the layout of FIGS. 6 to 10, the drawer has reached a position such that the recesses 19B of the oscillating arms 19 are aligned with the pins 21 and arranged there below. Likewise, the holes 7D of the drawer 7 are aligned with the pins 25, as shown in particular in FIG. 10.

Further lowering of the lever to its final position causes movements of the various members of the brewing unit, which from the position of FIGS. 6 to 10 reach the position of FIGS. 11 to 15. This movement is again guided by the slots 13 and by the guide 17, in which respectively the pins 11 and 15 slide. The pin 15 performs a translational downward movement in a substantially vertical direction and draws the perforating member 23 with it. The latter then penetrates the upper closing surface of the capsule C1 reaching the position of FIG. 14, in which the tip 23A of the perforating member has passed through the upper wall of the capsule C1 so as to place the water feed pipe in fluid connection with the capsule. As can be observed in FIGS. 4, 9 and 14, the perforating member 23 also has a pipe 23B to feed pressurized hot water, which reaches the inside of the capsule through the open tip 23A of the perforating member 23.

The lowering movement of the lever 9 from the position of FIGS. 6 to 10 to the position of FIGS. 11 to 15 also causes, as a result of the rotational-translation of the lever, a further movement of the pusher 10, which performs an over-travel with respect to the drawer 7, as mentioned above. This over-travel is made possible by releasing the pusher with respect to the drawer 7, obtained as a result of the elastic deformation of each appendage 10D caused by the teeth 10F, which are pushed by the step 5G of the edge 5F of the wall 5E.

Complete lowering of the lever 9 also causes lowering of the pins 21 and 25, which in this manner block movement of the drawer 7, due to penetration of the pins 25 in the holes 7D and the oscillating movement of the oscillating arms 19 with respect to the drawer 7, due to cooperation of the pins 21 with the recesses 19B. This allows even highly pressurized water to be fed inside the capsule C1 to obtain brewing.

After brewing the lever 9 is raised again from the position of FIGS. 11 to 15 to the position of FIGS. 1 to 5. In this movement the pusher 10 and the drawer 7, together with the perforating member 23, return to the initial position following movement of the lever. The return movement of the drawer 7 is obtained due to the thrust of the plates 10D of the pusher 10 against the terminal end of the guide 7A provided on each side of the drawer 7. The spent capsule C1 is retained in the brewing position and then ejected from the seat 7C, 19, 19 for example by providing an elastic leaf 29 (see for example FIGS. 4, 9) having a deformable and downward projecting end 29A, which interferes with the upper edge of the capsule when this tends to follow the extracting movement of the drawer (from left to right in the drawings). This interference blocks the capsule in the position of FIG. 14 preventing it from following the opening movement of the drawer 7. The oscillating arms 19 open as a result of the thrust exerted by the capsule C1 blocked in this position, sufficient to cause oscillation of the arms against the force of the springs (not shown), which stress them in the closed position. The opening travel of the drawer 7 is such that the arms move completely beyond the position of the spent capsule and can return (FIG. 5) to the position suitable to receive a new capsule for the subsequent brewing cycle, closing of the arms being obtained by the elastic force of the springs, not shown, acting on these arms.

The new capsule that is inserted in the drawer passes under the elastic leaf 29 deforming the end 29A thereof upwards.

FIGS. 20, 21A-21C partly show the brewing unit in a second embodiment. These figures only show some of the members of the unit, necessary in order to understand the difference with respect to the embodiment of FIGS. 1 to 19.

The substantial difference of this embodiment with respect to the previous one is the presence of a system of cam profiles provided on the bottom wall 5N of the fixed support 5. More in particular, two cam profiles 5P, having mirror symmetry with respect to a vertical median plane, are provided on this bottom wall. Each of the cam profiles 5P presents in substance a first rectilinear section 5S, substantially parallel to the direction f7 of movement of the drawer 7, a second section 5R, again rectilinear but inclined outwards with respect to the centerline, a third substantially circular section 5U and a fourth section 5T, again rectilinear and substantially parallel to the direction of motion of the drawer. This last rectilinear section 5T terminates at the central opening 5L of the bottom wall 5N of the support 5. Each of the oscillating arms 19 has a lower pin or stem 19D, which engages in the respective cam profile 5P.

The cam profiles 5P with which the followers formed by the pins or stems 19D cooperate control the oscillating opening and closing movement of the arms 19 about the pins 19A, without the need to employ elastic return members.

Figure 21A:
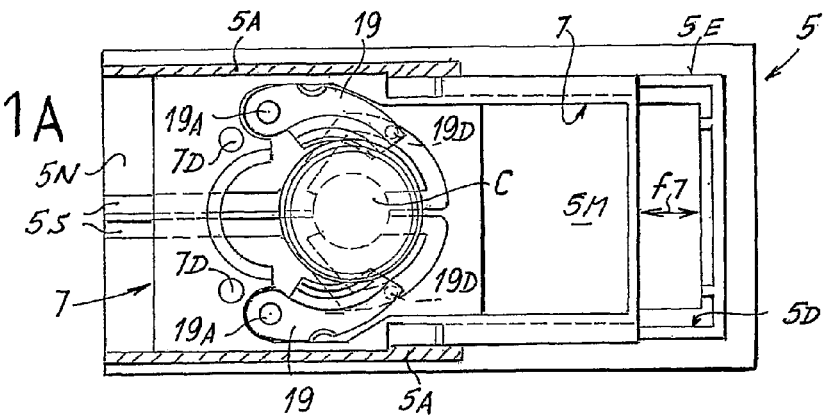
FIGS. 21A-21C show sections according to a substantially horizontal plane of the brewing unit in the variant of embodiment.
Figure 21B:
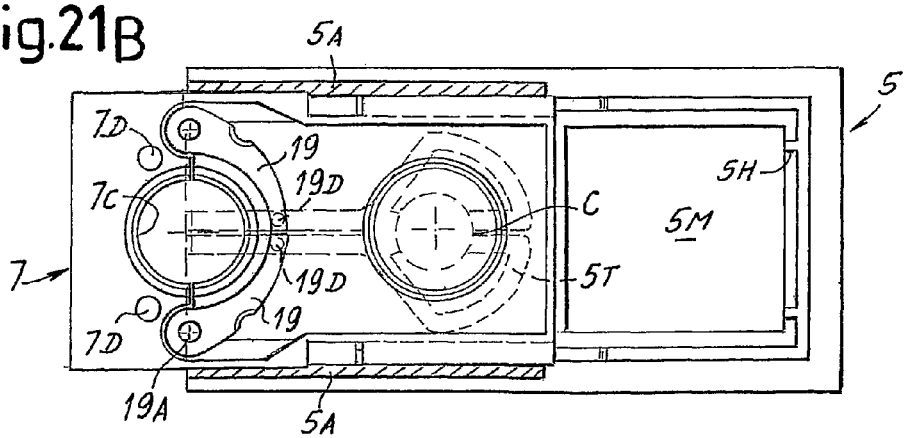
Figure 21C:
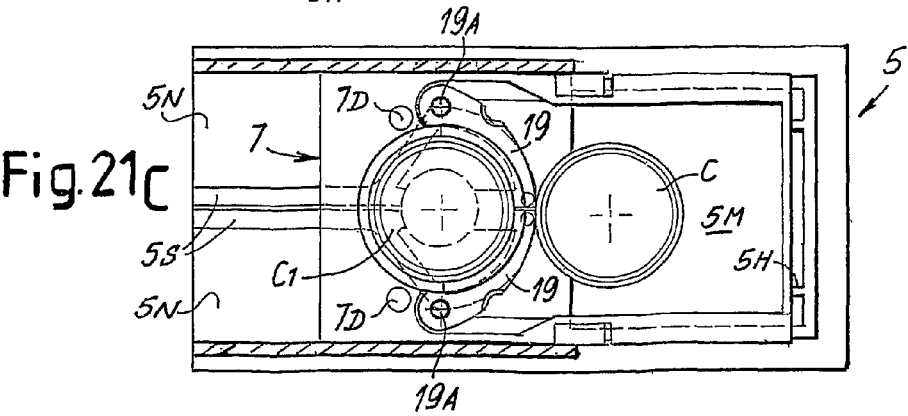

More specifically, when the drawer is in the brewing position (FIG. 21C), the stems 19D of the arms 19 are located at the front cusps, indicated with 5Q, of the cam profiles 5P. When the drawer 7 moves back from the brewing position to the opening position (FIG. 21B) the pins or stems 19D move along the circular sections 5U of the cam profiles 5P causing, with the simple translational movement of the drawer 7 controlled by the lever 9, an oscillating opening movement of the arms 19. This causes the arms 19 to open passing outside the spent capsule. The lateral wall of the spent capsule C pushes the arms so that these engage with the pins 19D in the circular section 5U of the cam profiles 5P, instead of being inserted in the rectilinear sections 5T. FIG. 21A shows an intermediate position of the drawer 7 in the opening movement from the brewing position (FIG. 21C) to the open position (FIG. 21B). The arms 19 are open and pass outside the spent capsule C.

In the completely open position of the drawer 7, the pins or stems 19D are engaged in the initial rectilinear sections (5S) of the cam profiles 5P. With the closing movement of the brewing unit obtained by gradually lowering the lever 9, the oscillating arms 19 remain in the closed position and push the spent capsule utilized in the previous cycle away from its position. The spent capsule prevents the oscillating arms 19 from opening and therefore the pins or stems 19D thereof continue a rectilinear movement parallel to the direction of feed of the drawer 7 and in the final section of travel thereof leave the rectilinear sections 5S of the profiles 5P through the opening 5L and are inserted in the rectilinear sections 5R of the cam profiles until reaching the aforesaid cusps 5Q.

It is understood that the drawing shows just one example, provided merely as a practical demonstration of the invention, which can vary in its forms and arrangements, without however departing from the scope of the concept underlying the invention.

For example, in a modified embodiment, the device can be designed to receive single serving pods rather than single serving capsules. In this case, the member 23 is no longer comprised of a perforating member with a hollow tip 23A, but of a dispensing member of other type. In some embodiments the member 23 can be composed of an element movable in a direction approximately orthogonal with respect to the pod, with a filter through which the pressurized water passes, surrounded by a sealing ring that is pressed against the surface of the pod. In this manner, a sealed volume is defined between the pressurized hot water-feed pipe and the pod, so that the water coming from the pipe is distributed by the filter over a surface corresponding to the surface inside the sealing ring and is forced to pass through the nonwoven, paper or other permeable material forming the shell of the pod and then through the ground coffee or other food product contained therein. Also in this case, simply by operating the lever 9, the kinematic mechanism described above allows all movements to be performed, including moving the dispensing member to rest against the pod to bring the dispensing member into fluid connection with the pod.

Any reference numbers in the appended claims are provided to facilitate reading of the claims with reference to the description and to the drawing, and do not limit the scope of protection represented by the claims.

The invention claimed is:

1. A brewing unit for preparing a beverage from single serving packages, comprising in combination:
   a support;
   a drawer, presenting at least a seat for a single serving package, slidable with respect to said support and movable in the same horizontal plane between a single serving package-loading position and a brewing position;
   a dispensing member to dispense pressurized water to said single serving package;
   a lever to control movement of said drawer and a mechanical connection between said lever and said drawer and between said lever and said dispensing member, operation of the lever alone causing both a horizontal translational movement of the drawer from the loading position to the brewing position in the same horizontal plane and a vertical downward translation movement of the dispensing member to bring the dispensing member into fluid connection with the single serving package to define a sealed area into which pressurized water is fed, and
   a stop element comprising an elastic tab having a deformable and downward projecting end which is integral with a support which blocks the single serving package in the brewing position preventing movement thereof towards the loading position when said drawer is moved from the brewing position to the loading position.

2. The brewing unit of claim 1, wherein the movement of said dispensing member and of said drawer are mutually coordinated so that the dispensing member rests against the single serving package when said single serving package has been taken to the brewing position by said drawer.

3. The brewing unit of claim 1, wherein said seat is partly delimited by at least one member movable with respect to said drawer, to allow removal of the spent single serving packages from said seat during movement of the drawer from the brewing position to the loading position.

4. The brewing unit of claim 3, wherein said movable member comprises an oscillating arm.

5. The brewing unit of claim 4, wherein said arm is oscillating about an axis orthogonal to the movement of said drawer.

6. The brewing unit of claim 4, wherein said oscillating arm or arms are elastically stressed in a closed position and are pushed towards an open position by the spent single serving package retained in the brewing position, during movement of the drawer from the brewing position towards the loading position.

7. The brewing unit of claim 4, wherein said oscillating arm or arms comprise a follower cooperating with a respective cam profile integral with said support, said cam profile controlling the movement of the corresponding arm when the drawer moves with respect to the support.

8. The brewing unit of claim 4, wherein the brewing unit further comprises a device to block said oscillating arm or arms.

9. The brewing unit of claim 8, wherein said blocking device of said oscillating arm or arms is controlled through said lever.

10. The brewing unit of claim 8, wherein said blocking device of said oscillating arm or arms comprises a pin for each oscillating arm.

11. The brewing unit of claim 10, wherein said pin or pins are integral with said dispensing member.

12. The brewing unit of claim 10, wherein: said drawer is slidingly constrained to a pusher, pivoted to said lever; the movement of said lever causes sliding of the pusher with respect to said support; and said pusher cooperates with the drawer drawing the drawer in the sliding movement between said loading position and said brewing position.

13. The brewing unit of claim 12, wherein the pusher is provided with an over-travel with respect to the drawer, beyond said brewing position, said over-travel corresponding to a movement of the lever with which the dispensing member is caused to rest against the single serving package.

14. The brewing unit of claim 13, wherein said pusher includes at least one elastic tooth to push said drawer towards the brewing position, said elastic tooth cooperating with a profile, which is fixed with respect to said support, to release the tooth from the drawer and allow said over-travel.

15. The brewing unit of claim 12, wherein said pusher is pivoted to said lever by a pin slidable in a shaped slot which allows an oscillation and translation movement of the lever with respect to the pusher.

16. The brewing unit of claim 15, wherein said slot is L-shaped.

17. The brewing unit of claim 15, wherein said pusher comprises two plates mutually joined by a cross member, which are slidingly housed in lateral guide grooves of said drawer.

18. The brewing unit of claim 12, wherein said pin is integral with said pusher.

19. The brewing unit of claim 3, wherein said seat is delimited, as well as by said at least one movable member, by a wall fixed with respect to said drawer.

20. The brewing unit of claim 19, wherein said fixed wall defines an inner surface with a shape corresponding to the shape of the single serving package.

21. The brewing unit of claim 1, wherein said seat is partly delimited by a pair of oscillating arms.

22. The brewing unit of claim 21, wherein said oscillating arms are symmetrical with respect to the direction of movement of said drawer.

23. The brewing unit of claim 21, wherein said arms are oscillating about axes orthogonal to the direction of movement of said drawer.

24. The brewing unit of claim 21, wherein said fixed wall and said pair of oscillating arms together form an truncated cone shaped surface, corresponding to the outer lateral surface of the single serving packages, and in that the fixed wall is facing backwards and the arms are facing forwards with respect to the movement of the drawer from the loading position to the brewing position.

25. The brewing unit of claim 1, wherein said elastic tab allows passage of the single serving package towards the brewing position and prevents passage of the single serving package in the opposite direction.

26. The brewing unit of claim 1, the brewing unit further comprising a drawer movement block, said block preventing movement of the drawer during brewing.

27. The brewing unit of claim 26, wherein said drawer movement block is controlled by said lever.

28. The brewing unit of claim 26, wherein said block comprises at least a movable pin, controlled by said lever, which can be inserted in and removed from a hole provided in said drawer.

29. The brewing unit of claim 28, wherein said block comprises two movable pins, controlled by said lever, which can be inserted in and removed from corresponding holes provided in said drawer.

30. The brewing unit of claim 28, wherein said pin or pins are integral with said dispensing member.

31. The brewing unit of claim 1, wherein said lever comprises a first follower cooperating with a first cam profile integral with said support, said cam profile including:
   a first curved portion extending between a first end of the first cam profile corresponding to the loading position of the drawer, and an intermediate point of said cam profile, at which the drawer is in the brewing position and the dispensing member is not in fluid connection with the single serving package;
   a second curved portion extending between said intermediate point and a second end of the first cam profile, said second end corresponding to a position, in which said dispensing member is in fluid connection with the single serving package.

32. The brewing unit of claim 31, wherein said first follower comprises a first cross pin and in that said first cam profile is comprised of two channels with mirror symmetry provided in two corresponding side panels of said support.

33. The brewing unit of claim 31, wherein said lever comprises a second follower cooperating with a second cam profile integral with said support, said second cam profile having a rectilinear shape, orthogonal to the direction of movement of said drawer and parallel to the movement of the dispensing member.

34. The brewing unit of claim 33, wherein said second follower comprises a second cross pin and in that said second cam profile is comprised of two channels with mirror symmetry provided in two corresponding side panels of the support.

35. The brewing unit of claim 34, wherein said second pin is constrained to a slide on which said dispensing member is mounted.

36. The brewing unit of claim 35, wherein said slide is guided by pins sliding in through holes provided in said support.

37. The brewing unit of claim 1, wherein said lever comprises a shaped slot in which a pin engages for mechanical connection between said lever and said drawer.

38. The brewing unit of claim 1, wherein said dispensing member comprises a perforator to perforate said single serving packages, the movement of the dispensing member to rest against the single serving package causing perforation thereof by said perforator.

39. The brewing unit of claim 38, wherein said perforator comprises a hollow tip through which pressurized water is dispensed inside the single serving package.

\* \* \* \* \*